(No Model.)
G. McGREGOR.
RAILWAY GAGE.
No. 309,792. Patented Dec. 23, 1884.
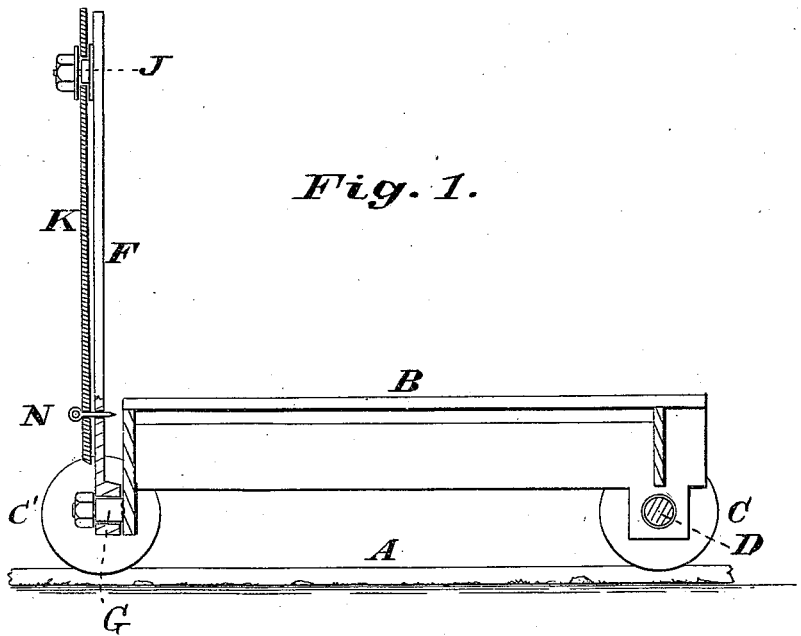
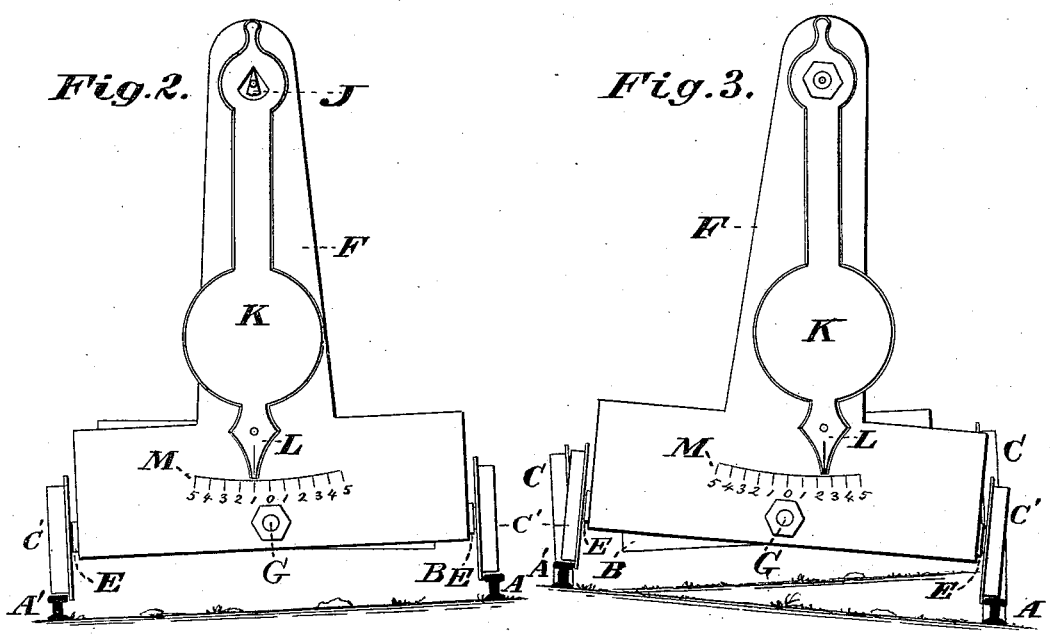
Attest:
A. P. Knight
Geo. L. Wheelock
Inventor:
George McGregor
By Knight Bros.
Attys.

UNITED STATES PATENT OFFICE.

GEORGE McGREGOR, OF CINCINNATI, OHIO, ASSIGNOR TO GEORGE W. McGREGOR, OF SAME PLACE.

RAILWAY-GAGE.

SPECIFICATION forming part of Letters Patent No. 309,792, dated December 23, 1884.

Application filed August 5, 1884. (No model.)

*To all whom it may concern:*

Be it known that I, GEORGE MCGREGOR, of Cincinnati, Hamilton county, Ohio, have invented a new and useful Improvement in Railway-Gages, of which the following is a specification.

The invention relates to a means for verifying the proper relative elevation of the two rails composing a railroad-track or their degree of departure from such relative elevation, it being understood that on a straight stretch the component rails should show precise agreement of level, while on curves their relative height should have a certain predetermined difference, depending on the sharpness of the curve and the maximum speed of running.

To this end the invention consists in hanging a plumb-bob or pendulum on a standard, which is so pivoted to the car-body as to be capable of free oscillation transversely of the track, said standard having attached to it the axle of the front wheels, and said pendulum being capable of hanging vertically, notwithstanding oscillations of the said standard, and indicating upon a graduated scale inscribed upon said standard whether at that precise plane the two rails are at the same level or to what extent out of level. For this purpose the graduations on the scale are made to indicate the exact relative elevations of the two rails in parts of inches or of centimeters, or any other accepted basis of measurement, by the pendulum falling over to that side which is, for the time being, more depressed than the other.

In the accompanying drawings, Figure 1 is a fore-and-aft vertical section of a railway-car embodying my invention. Figs. 2 and 3 are front elevations of such a car at two different parts of an uneven track.

A A' may represent portions of the component rails of a railway-track.

B may represent the body or platform of a hand-car, whose rear wheels, C, are keyed fast to customary shaft, ("axle,") D. This shaft, where the car is adapted for propulsion by persons riding upon it, is connected, by any suitable transmitting mechanism, with customary hand-levers. (Not here shown.) In the form selected for the present illustration the front wheels, C', revolve freely on the front axle, E, which is a true axle—that is to say, it does not itself revolve, being firmly attached to a standard, F, that is coupled to the car body or platform B by a pivot, G, situated midway between and parallel to the rails. This construction enables vertical oscillation (about said pivot G) of the said standard and of its attached axle relatively to both the pendulum and to the car-body and the rear axle.

From the upper part of the standard F projects a fulcrum, J, in form of an inverted V, upon which is hung a pendulum or plumb-bob, K, which terminates below in a pointer, L, whose position relatively to a scale, M, inscribed upon the standard, indicates the precise relative height of the two rails at that particular spot.

Unnecessary wear of the pendulum when not in use may be prevented by insertion of a pin, N, through suitable orifices in both pendulum and standard.

The above-described preferred form of my invention may be varied in non-essential particulars. For example, the standard may be provided with such scale and corresponding pendulum on its rear, either instead of or in addition to its front side, as here shown. The front axle may, like the rear axle, be keyed fast to the wheels and revolve in journal-bearings, which bearings in that case are (instead of the axle itself) pivoted to the oscillating standard.

I claim as new and of my invention—

1. A railway-car having one axle so pivoted to the car-body as to be capable of oscillation transverse to the track independently of said body and of the other axle, in combination with a pointer suspended from a vertical projection from said oscillating axle, said projection being marked with a corresponding scale, substantially as and for the purpose set forth.

2. In a railway-car, the vertical projection F from the front axle, E, so coupled to the car-body by pivot G, parallel to and midway between the rails, as to be capable of such oscillation relatively to said body, and to a pointer, K, suspended from said projection, as to indicate upon a scale on said projection the relative heights of the rails in the plane of said axle, substantially as set forth.

In testimony of which invention I hereunto set my hand.

GEORGE McGREGOR.

Attest:
 GEO. H. KNIGHT,
 CHAS. E. PRIOR.